United States Patent
Arumugam (10) Patent No.: US 10,178,088 B2
(45) Date of Patent: Jan. 8, 2019

(54) SYSTEM AND METHOD FOR MANAGING OFFLINE AND ONLINE PASSWORD BASED AUTHENTICATION

(71) Applicant: Tejas Networks Ltd., Bangalore (IN)

(72) Inventor: Vijayakumar Vijayamangalam Arumugam, Tamil Nadu (IN)

(73) Assignee: Tejas Networks Ltd.

( * ) Notice: Subject to any disclaimer, the term of this patent is extended or adjusted under 35 U.S.C. 154(b) by 215 days.

(21) Appl. No.: 15/066,400

(22) Filed: Mar. 10, 2016

(65) Prior Publication Data

US 2016/0269392 A1    Sep. 15, 2016

(30) Foreign Application Priority Data

Mar. 12, 2015  (IN) ............................ 1221/CHE/2015

(51) Int. Cl.
H04L 29/06    (2006.01)

(52) U.S. Cl.
CPC ........ H04L 63/083 (2013.01); H04L 63/0876 (2013.01)

(58) Field of Classification Search
CPC .... H04L 63/0876; H04L 63/083; H04L 29/06
See application file for complete search history.

(56) References Cited

U.S. PATENT DOCUMENTS

| | | | | |
|---|---|---|---|---|
| 7,984,491 B2 * | 7/2011 | Ueda | ......................... | G11C 7/24 380/54 |
| 8,689,294 B1 * | 4/2014 | Thakur | .................. | H04L 63/08 713/182 |
| 8,990,888 B2 * | 3/2015 | Busser | ..................... | G06F 21/31 380/44 |
| 2005/0138656 A1 * | 6/2005 | Moore | ................... | H04N 7/165 725/45 |
| 2006/0015725 A1 * | 1/2006 | Voice | .................. | H04L 63/0245 713/168 |
| 2008/0235772 A1 * | 9/2008 | Janzen | ..................... | G06F 21/31 726/5 |
| 2008/0289022 A1 * | 11/2008 | Chiu | ....................... | G06F 21/34 726/9 |
| 2009/0240939 A1 * | 9/2009 | Mizukoshi | .......... | H04L 63/0838 713/168 |
| 2011/0055585 A1 * | 3/2011 | Lee | ........................ | H04L 9/0844 713/183 |
| 2012/0066749 A1 * | 3/2012 | Taugbol | .................. | G06F 21/35 726/6 |
| 2012/0143752 A1 * | 6/2012 | Wong | .................... | G06Q 20/105 705/41 |
| 2013/0145170 A1 * | 6/2013 | Rese | ........................ | G06F 21/40 713/183 |

(Continued)

*Primary Examiner* — Abu S Sholeman
(74) *Attorney, Agent, or Firm* — Mintz Levin Cohn Ferris Glovsky and Popeo, P.C.

(57) ABSTRACT

A method and system has been provided in which the security of passwords in general and offline passwords in particular can be enhanced and which can enable users to be authenticated into secure network systems via network elements (NEs) in case of non-availability of centralized authentication system (CAS). The overall security of network or CAS or systems operating in isolated yet secured environment can be prevented from compromise even if the offline password is compromised. Related apparatus, systems, techniques, and articles are described.

10 Claims, 6 Drawing Sheets

(56) References Cited

U.S. PATENT DOCUMENTS

| | | | |
|---|---|---|---|
| 2013/0145449 A1* | 6/2013 | Busser | G06F 21/31 |
| | | | 726/7 |
| 2013/0198284 A1* | 8/2013 | Karri | H04L 67/306 |
| | | | 709/204 |
| 2014/0165215 A1* | 6/2014 | Kurkure | G06F 21/10 |
| | | | 726/30 |
| 2016/0191245 A1* | 6/2016 | Qin | H04L 9/3226 |
| | | | 713/168 |

* cited by examiner

SYSTEM AND METHOD FOR MANAGING OFFLINE AND ONLINE PASSWORD BASED AUTHENTICATION

RELATED APPLICATIONS

This application claims priority under 35 U.S.C. § 119 to Indian Patent Application No. 1221/CHE/2015 filed on Mar. 12, 2015, the entire contents of which is hereby expressly incorporated by reference herein.

FIELD

The present disclosure relates generally to password authentication and, more particularly, systems and methods for managing offline and/or online password based authentication in order to enhance security.

BACKGROUND

The background description includes information that may be useful in understanding the present invention. It is not an admission that any of the information provided herein is prior art or relevant to the presently claimed invention, or that any publication specifically or implicitly referenced is prior art.

Unauthorized access to data and databases is a major concern for all network administrators. The increase in processor speed though making the network efficient and faster, also allows hackers and intruders to use same systems for breaching the security systems of the networks and for gaining access to secure and unsecured data. Even at a very fundamental level, access to networks and computer systems are being allowed through user authentication and passwords. The simplicity or complexity of a password depends generally on type of data stored in the system, and how secure one wants to make the total system. Security comes with an associated cost. This cost can be in terms of hardware and also in terms of time taken to access the system, both of which are at premium. One would like to have the most secure system at the least cost. Generally it can be said that a system or network can be made as secure as the time made available for authentication and verification of credential. However, everyone wants instant access to the system and hates to wait even for few seconds to login. Network administrator and security manager have to therefore fine-tune their security requirements and systems within these parameters.

Passwords are generally stored in databases so that when a user logs-on, the password entered by him can be compared against the one stored in the database, and based on the result, the user can be denied or granted permission. Hackers normally target the database to access the passwords. Methods for enhancing the security of passwords employ techniques such as encryption and/or hashing techniques like SHA256, SHA512. However, such secure passwords can also be compromised/breached through brute force attacks and/or dictionary attacks by targeting the password database.

Another technique commonly referred to as "adding salt" can be used before hashing the password to further enhance the security of passwords. Though this can further delay, but even these methods are not totally immune to the possibility/probability for cracking of passwords. This is more so because hackers and intruders today can work offline on retrieved password database and use high speed, cheaply available processors and machine for such task.

To further increase the time required to crack the passwords, a technique called "slow hashing"/"key stretching" is used by applying algorithms like PBKDF2. Using this however, the intruder can increase the scale of his offline attack, and then it's just a question of time before the intruder gets the original passwords.

The hashed passwords can be encrypted but the secret key needs to be stored in the local machine to verify the password, and therefore if an intruder gets access to the file system, he/she can retrieve the secret key as well. Once the secret key is used, some of the above mentioned techniques can be used to crack the passwords. Therefore, neither the hashing techniques nor the encryption mechanisms seem to be fully securing the passwords in the present state of implementations.

SUMMARY

There is therefore a need to develop methods and systems to further enhance the security of passwords and also ensure that the security of complete network especially secured part of the network will not be breached even if some passwords are compromised.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It is an object of the present disclosure to present a design of a secure password system that can generate online and offline password for logging onto a secure network.

It is an object of the present disclosure to present a design of a secure password system that can generate online and offline password using hash key method.

It is yet another object of the present disclosure to present a design of a secure password system that can generate online and offline password using slow hash key method.

It is yet another object of the present disclosure to present a design of a secure password system that can generate online and offline password using slow hash key, wherein the slow hash key value for online password and offline password can be different.

It is yet another object of the present disclosure to present a design of a secure password system that can generate online and offline password using slow hash key method, wherein the slow hash key value for online password can be minimal, i.e., in order of seconds.

It is yet another object of the present disclosure to present a design of a secure password system that can generate online and offline password using slow hash key method, wherein the slow hash key value for offline password can be large/high, i.e., in order of minutes.

It is an object of the present disclosure to present a method wherein the user uses online password to log onto a network element by means of centralized authentication system (CAS).

It is an object of the present disclosure to present a method wherein the user can use offline password, whenever CAS is offline, to authenticate itself at a network element (NE).

Systems and methods are provided for enhancing security of offline passwords, and enabling a user to be authenticated using the offline password at a Network Element (NE) in case of non-availability of Central Authentication Server (CAS) without in anyway compromising the overall security of the system, user, or any other resource connected thereto. In the event of the CAS being available, online password can be used for the authentication at the NE.

According to one aspect of the present disclosure, the proposed method enables authentication of the clients/users at one or more NE's through the CAS by using online passwords in case of availability of the CAS, and using offline passwords in case of non-availability of CAS, and wherein database/repository storing the offline and/or the online passwords can be configured within the Central Authentication Server (CAS) or can be operatively coupled thereto. In an aspect, during handshake between a network element and the CAS, the CAS can share the offline password(s) for one or more users with the respective network element, based on which the network element can then use the offline password to authenticate the user in the offline mode when the CAS is not reachable/available.

According to one embodiment, in order to enable efficient/fast user access/experience and strong security at the same time, online password can be generated by means of a slow hashing technique, wherein the value of the slow hashing can be kept minimal (e.g., second slow hash value), say around a few seconds or lesser. On the other hand, the offline password can be generated by means of the slow hashing technique, wherein the value of the slow hashing can be kept very high/large/long (e.g., first slow hash value). Such longer hash value (the length of the hashed password remains same for both online and offline passwords. However, the time to arrive at the hashed password differs) based offline passwords, even if accessed by an intruder, would take years for him/her to crack, thereby significantly enhancing the security during offline authentication, whereas ensuring efficient user experience during low hash value based online passwords that would be made use of during normal circumstances when the CAS is functional/accessible.

According to one embodiment, slow hash value technique for password generation can be combined with other security and encryption techniques for enhancing password security including but not limited to adding salt, and memory hard functions such as scrypt.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Methods and systems are provided for enhancing security of offline passwords to enable user to be authenticated via NEs in case of non-availability of CAS, without in anyway compromising overall security of CAS or systems operating in isolated yet secured environment even if the offline password is compromised.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, and firmware.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Systems and methods are provided for enhancing security of offline passwords, and enabling a user to be authenticated using the offline password at a Network Element (NE) in case of non-availability of Central Authentication Server (CAS) without in anyway compromising the overall security of the system, user, or any other resource connected thereto. In the event of the CAS being available, online password can be used for the authentication at the NE.

According to one aspect of the present disclosure, the proposed method enables authentication of the clients/users at one or more NE's through the CAS by using online passwords in case of availability of the CAS, and using offline passwords in case of non-availability of CAS, and wherein database/repository storing the offline and/or the online passwords can be configured within the Central Authentication Server (CAS) or can be operatively coupled thereto. In an aspect, during handshake between a network element and the CAS, the CAS can share the offline password(s) for one or more users with the respective network element, based on which the network element can then use the offline password to authenticate the user in the offline mode when the CAS is not reachable/available.

According to one embodiment, in order to enable efficient/fast user access/experience and strong security at the same time, online password can be generated by means of a slow hashing technique, wherein the value of the slow hashing can be kept minimal, say around a few seconds. On the other hand, the offline password can be generated by means of the slow hashing technique, wherein the value of the slow hashing can be kept very high/large/long. Such longer hash value based offline passwords, even if accessed by an intruder, would take years for him/her to crack, thereby significantly enhancing the security during offline authentication, whereas ensuring efficient user experience during low hash value based online passwords that would be made use of during normal circumstances when the CAS is functional/accessible.

According to one embodiment, slow hash value technique for password generation can be combined with other security and encryption techniques for enhancing password security including but not limited to adding salt, and memory hard functions such as scrypt.

According to one embodiment, system of the present disclosure enables a centralized authentication server (CAS), also referred to as centralized server or database or repository hereinafter, to generate and/or store, for one or more users, offline as well as online passwords for being stored in the memory/database/repository device that either forms part of the CAS or is operatively coupled thereto. According to one embodiment, the offline passwords can be generated such that the time taken to crack/break them is much longer than the time it takes for an online passwords to be cracked, which enables storing of the offline password, if desired, in one or more network elements that are connected with the CAS. Such storage of offline passwords for one or more users in local memory of one or more network elements enables offline authentication of a user to take place when the CAS is not reachable/functional.

According to one embodiment, "show hashing" technique can be used for generating online and/or offline passwords, wherein the value of the slow hashing while generating the online password can be kept low and the value of the slow hashing while generating the offline password can be kept large/long/high, for instance, by repeatedly performing the hash function a defined number of times.

According to another embodiment, offline password can be shared by the CAS with one or more network elements during their respective handshake processes with the CAS, which enables storage of the offline passwords into the memory of the network element(s). Such handshake process can take place either at periodic intervals or can be performed based on user's preferences or on per-defined actions taking place. Any configuration of such handshake process between NE and CAS is completely within the scope of the present disclosure. In case the offline password is changed by the user/network administrator, handshake process can be re-initiated and the offline password can be transferred from the database of/associated with the CAS to the network element. According to one embodiment, handshake process can also include/involved or referred to as synchronization process.

During user authentication at a given NE, if it is determined that the CAS is available and reachable, online authentication can take place by processing of the authentication request at the CAS itself with respect to the online password, whereas, if it is determined that the CAS is not available and/or not reachable, offline authentication can take place by processing of the authentication request locally at NE itself with respect to the offline password stored therein.

Figure 1:
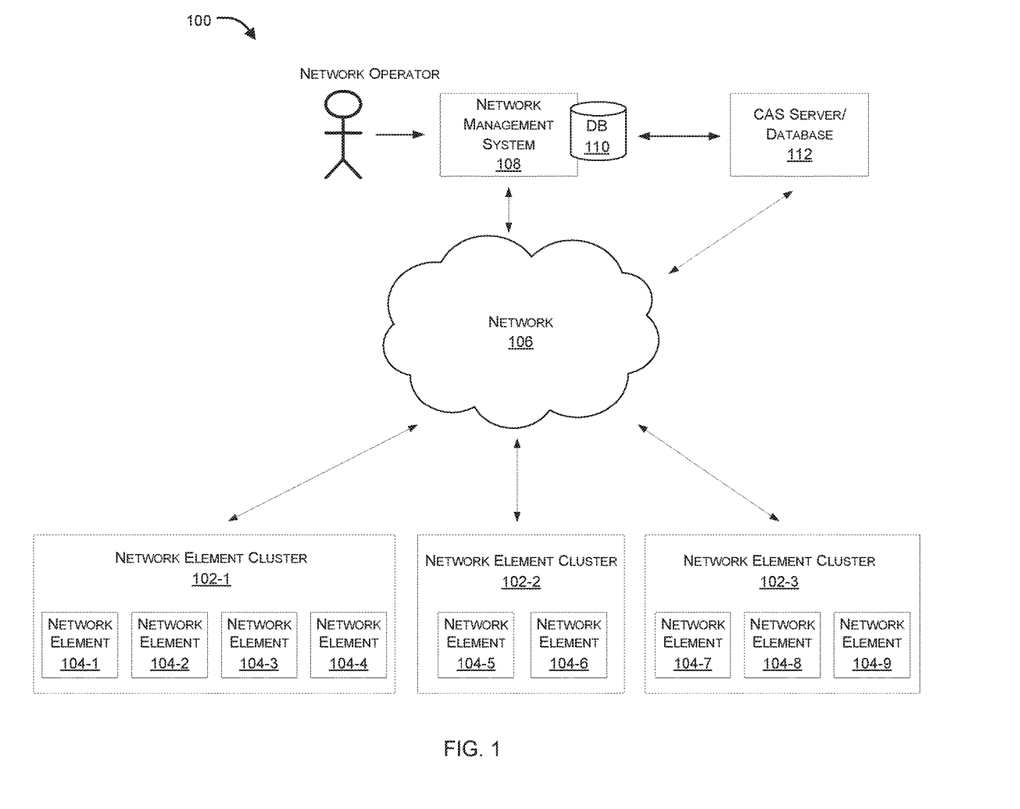
FIG. 1 illustrates an exemplary network architecture in accordance with an embodiment of the present disclosure.

Embodiments of present disclosure and their advantages can be best understood by reference to FIG. 1. FIG. 1 illustrates an exemplary network architecture 100 in which embodiments of the present disclosure can be implemented. The exemplary network 100 can include one or more network element clusters such as 102-1, 102-2, and 102-3, collectively referred to as NE Cluster 102 hereinafter, wherein each cluster 102 can include one or more network elements such as, for instance, cluster 102-1 includes NE's 104-1, 104-2, 104-3, and 104-4, whereas cluster 102-2 includes NE's 104-5 and 104-6. One should appreciate that although the present representation 100 shows a defined number of clusters and network elements therein, a typical network architecture can include numerous clusters 102 and numerous network elements 104 that form part of each cluster, and therefore any such configuration/construction/structure is completely within the scope of the present disclosure. According to another embodiment, network elements 104 need not necessarily form part of a network cluster 102 and can stand independently.

According to one embodiment, network elements 104 can be operatively coupled with a network management system/device 108 over a network 106 to enable access to one or more network resources. Although the present network management system (NMS) 108 is shown as a single device, in implementation, the system can include a plurality of devices or be operatively coupled thereto, wherein, for instance, system 108 can include or be coupled with a firewall, a gateway device, a router, a switch, a hub, an intrusion prevention system (IPS), an intrusion detection system (IDS), or any other device/sub-system/component. All such network configurations are therefore completely within the scope of the present disclosure.

According to one embodiment, NMS 108 can be configured to enable authentication and/or access control of a user that tries to use/access/log into a network element 104. NMS 108 can be managed through a network operator/network administrator that configures the manner/mode in which incoming/outgoing traffic, user requests, passwords, among other aspects need to be managed. NMS 108 can further include or be operatively coupled with a database 110 to store such configuration data/settings. According to one embodiment, the database such as 110 can be encrypted.

According to another embodiment, architecture 100 can further include a centralized authentication system/server 112, which can also be configured as a database 112 or a combination therefore. One should appreciate that the illustrated configuration is completely exemplary in nature and any change in the same is completely within the scope of the present disclosure. For instance, CAS server 112, as shown, can also be directly accessible to the user/network element 104 without going through the NMS 108. In another exemplary embodiment, for instance, the database 110 can be configured to be common for both the NMS 108 as well as for the CAS server 112.

According to one embodiment, CAS 112 can be used for generation of online and/or offline password for a given user, wherein the passwords can be stored in a repository and/or a database. Such passwords can also be updated/modified/renewed at periodic intervals or based on user-defined preferences. According to one embodiment, both or either of the offline as well as the online passwords can be generated using slow hash technique, wherein the hash key value for online passwords can be kept low, for instance, in order of seconds, say from few milliseconds to a few seconds in general (e.g., second slow hash value), whereas, the hash key value for offline passwords can be kept high/large, for instance, in order of minutes (e.g., first slow hash value), say 1-2 minutes in general. According to one embodiment, online passwords can have their slow hash values, say between 50 milli seconds to 02 seconds. In an embodiment of the present disclosure, slow hash value technique for password generation can be combined with other security and encryption techniques for enhancing the password security such as adding salt, and memory hard functions such as scrypt. According to another embodiment, offline password generator can be configured to generate passwords using key derivation functions such as PBKDF2 (password-based key derivation function two), wherein PBKDF2 can iteratively apply a selected pseudorandom function such as MD5 (message digest five), SHA-2 (secure hash algorithm two), SHA-256, or HMAC-MD5 (hash-based message authentication code using MD5), HMAC-SHA-2, or HMAC-SHA-256, on the desired input values. The iteration count of the PBKDF2 algorithm is determined by the slow hash time chosen for online and offline passwords.

According to one embodiment, any or a combination of NMS 108, database 110, and CAS 112 can be located behind a firewall in a demilitarized zone (DMZ). Any other architecture and/or construction can therefore be incorporated and would be well within the scope of the present disclosure.

According to one implementation, network element 104 can be configured undertake a handshake/synchronization with the CAS 112, based on which the CAS 112 can shared a configured number of offline password(s) for one or more users with the network element 114, which can be updated whenever the passwords or any other setting/parameter/attribute related thereto changes. Such offline passwords can then be copied to the local memory and/or any other storage device coupled with the network element and stored in a compressed, encrypted, or any other desired format and used for offline authentication when the CAS 112 is not accessible reachable.

In an exemplary implementation, when a user attempts to log into a network element 104, the element 104 checks if the CAS 112 is accessible, wherein if the CAS 112 is accessible, the online authentication is conducted by means of the CAS and based on the online password, wherein if the CAS is not accessible and/or reachable, offline authentication can be conducted locally by the element 104 by means of the "high slow hash value" based offline password stored in the element 104. In an aspect, if the CAS is not available and the offline password is also not stored/accessible to the NE 104, the user can be denied authentication till the CAS becomes reachable for online authentication or for enabling storage/copying of the offline password to the local device of the NE 104 to enable offline authentication.

Figure 2:
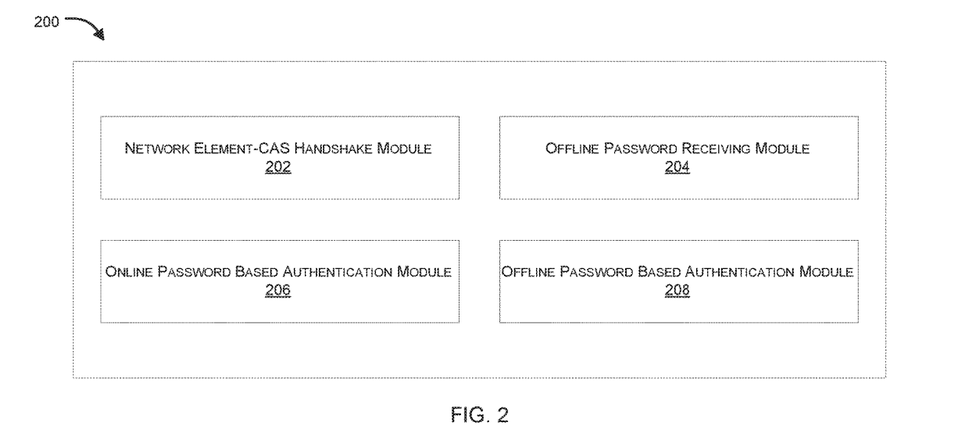
FIG. 2 illustrates exemplary functional modules of the proposed network element in accordance with an embodiment of the present disclosure.

FIG. 2 illustrates exemplary functional modules of the proposed network element architecture 200 in accordance with an embodiment of the present invention. One should appreciate that although the present disclosure has been described with reference to network element, any other computing device such as a network coupled laptop/PC/mobile phone/tablet/smart phone, among others can also be configured to enable authentication of a user, and therefore any such construction is completely within the scope of the present disclosure. According to one embodiment, the term "module" is used herein to denote a functional operation that may be embodied either as a stand-alone component or as an integrated configuration of a plurality of subordinate components. Moreover, although the functional modules are described herein as being installed on a storage device, and therefore being implemented in software, it could be implemented in any of hardware, e.g., electronic circuitry, firmware, software, or a combination thereof. One of the components of proposed functional modules can include a hash function, which is a function that maps a first data set, called a key, into a second data set, called a hash value.

According to one embodiment, the network element architecture 200 can include a network element-CAS handshake module 202, an offline password receiving module 204, an online password based authentication module 206, and an offline password based authentication module 208. One should appreciate that one or more modules can be combined and/or divided to form sub-modules, and therefore any such change in functional or configuration thereof is completely within the scope of the present disclosure. In addition, new functional modules can also be added at the convenience of the system implementation and all such function modules such as for logging in of a user, generation of offline/online passwords, change of passwords, user authentication, password management, among others are well within the scope of the present disclosure.

According to one embodiment, network element-CAS handshake module 202 can be configured to establish a handshake between the NE and the CAS. Such handshake can also be referred to as or can include synchronization of settings between the CAS and the NE. As a network administrator can typically make network-level configuration changes to the CAS, wherein such changes can be transpired down the hierarchy by means of such handshake/synchronization protocol that implements the settings/configurations to one or more network elements. In an instance, module 202 can be configured to be implemented periodically or randomly based on actions of the network administrator/controller, or based on certain activities taking place such as restarting of a network element, major configuration change made in the CAS, change in data structure/content stored in the CAS, among other like changes. In another embodiment, handshake can be configured to take place whenever the network connection is lost, or when the same is re-established, or when the password is changed, or when a new user is added into the CAS database. Any other activity can also be used for triggering the handshake to take place, all of which are completely within the scope of the present disclosure.

According to one embodiment, offline password receiving module 204 can be configured to enable the network element (NE) to receive the offline password stored by the CAS. During offline password can be sent for a defined/configured number of users and can either be sent as part of the handshake process (module 202) or can be sent separate to the handshake event. Offline password can also be sent whenever there is a change in the password or any characteristic thereof. According to one embodiment, offline password stored by the CAS can be generated based on a high "slow hash" value so as to enable a given password to be re-hashed a high number of times, making it extremely tough for an intruder to get access to the password. Offline password can either be stored in the local memory of the network element that has received the same, or can be stored in any other storage device that is operatively coupled with the network element. According to one implementation, during the handshake or whenever required, the CAS can be configured to return hashed passwords that have been computed with longer slow hash value, whereas the passwords created by minimal slow hash values (online passwords) can be kept in the CAS database itself for use during online authentication. Therefore, the CAS, in an exemplary embodiment, keeps two sets of hashed passwords in its database.

According to another embodiment, online password authentication module 208 can be configured to enable a user to authenticate himself/herself on a network element by means online authentication through the CAS, which uses the online password to match/check if the password received from the user matches with the online password stored in the CAS.

According to another embodiment, offline password authentication module 208 can be configured to enable a user to authenticate himself/herself on a network element itself when the CAS is not reachable, wherein such authentication can take place based on the offline password stored in the network element. In case no offline password is stored, the user can be denied access and/or the authentication request can be kept pending till the CAS comes up, post which the online password based authentication can then take place along with the handshake process that would result in the offline password being copied to the network element memory.

Figure 3A:
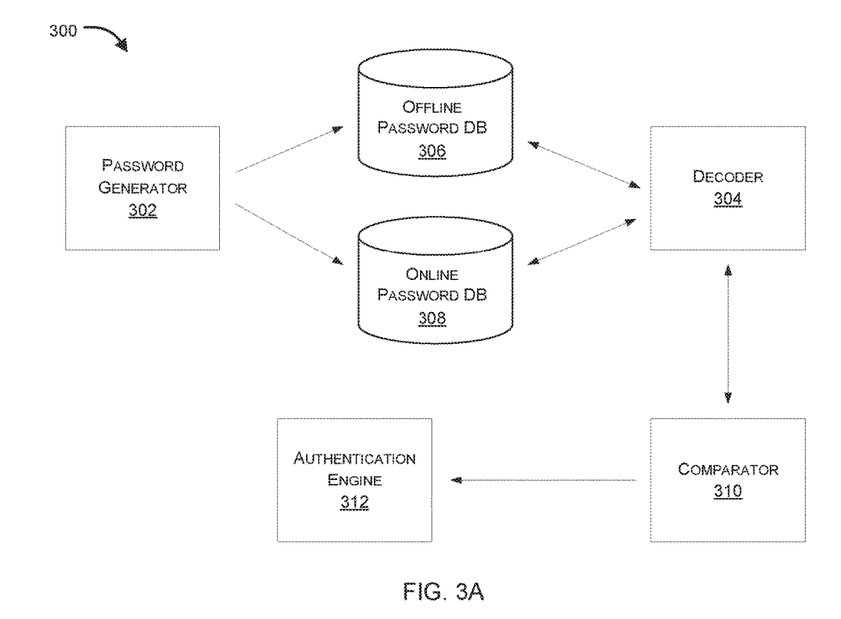
FIGS. 3A and 3B illustrate a representation showing generation of offline and online passwords for conducting user authentication in accordance with an embodiment of the present disclosure.

FIG. 3A illustrates exemplary set of actions that can be configured to take place at the CAS, wherein the CAS can include or be operatively coupled with a password generator that, for instance, works on slow hashing technique to generate different online and/or offline passwords. As illustrated in FIG. 3A, the password generator 302 can be configured to, for a defined number of users, generate an online password using minimal "slow hash" value (e.g., second slow hash value) and store the generated online password in a database such DB 308. Password generator 302 can also be configured to, for a defined number of same or other users, generate an offline password using high/large "slow hash" value (e.g., first slow hash value) and store the generated offline password in a database such DB 306. In an implementation, the password generator 302 can receive a password input from the user, and combine it with one or a combination of specified hash key algorithm(s)/function(s)

to generate required hash keys for an online password and an offline password. According to one embodiment, it may not be necessary to generate offline and online passwords for all the users, wherein, for instance, some low-ranking users can always be mandated to get themselves authenticated online and not through the offline mode.

In an exemplary implementation, during authentication, when a user makes a request, the network element can check if the CAS is available, such that if the CAS is available, the online password stored in the database 308 that corresponds to the requesting user can be retrieve and then processed by a decoder 304 to enable comparison (by means of comparator 310) between the decoded password and the password received from the user as part of the authentication request. The authenticator 312 and/or the authentication engine 312 can then be used to authenticate the user based on the output from the comparator 310. According to one implementation, instead of decoding, the password received as part of the authentication request can also be hashed using the same hash function/value and then the stored hash can be compared with the currently hashed output. According to one embodiment, in case of encryption, the password can be decrypted/decoded using secret key and compared, whereas in case of hashing, the conversion is one way. The hashed password can't be decoded and therefore, a user inputted password needs to be hashed again and then compared with stored one. Decoder of the present disclosure can therefore also be interchangeably referred to as hasher and can be configured to perform decoding in case passwords is encrypted, else it would apply chosen hashing algorithm to get hashed password.

Figure 3B:
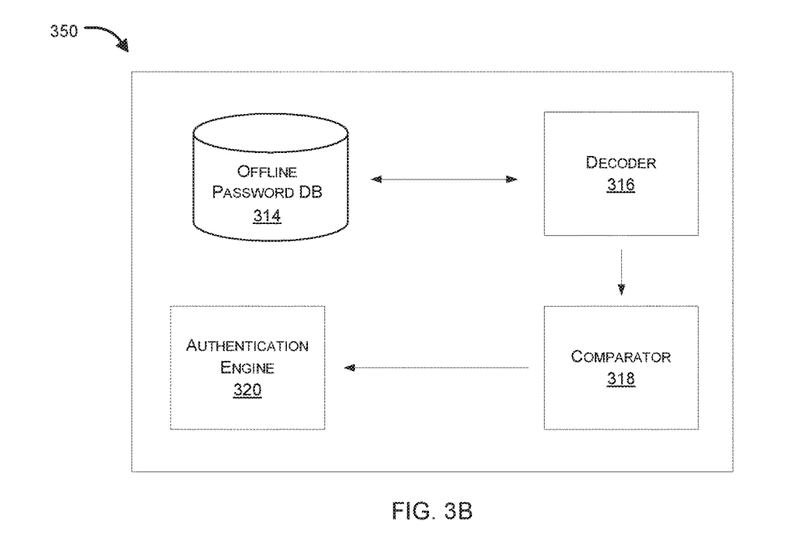

FIG. 3B illustrates the scenario with respect to offline authentication, wherein during handshake, the CAS can share the encoded/encrypted/hashed offline password with the network element 350 that can be configured to store the password in a local database, say 314. During authentication, if it is found that the CAS is not available, the network element 350 can retrieve the offline password from the database 314 and then decode it by means of a decoder 316 to enable comparison (using comparator 318) between the password entered by the user as part of the authentication request and the decoded offline password, based on which the authentication engine 320 can authenticate the user.

According to one embodiment, network element and/or the CAS can be configured such that the offline password is valid only for a defined period of time, post which, a new offline password would be computed by the CAS and then shared with the network elements during the handshake. According to one embodiment, the offline password generator can generate a password using parameters that can include a shared secret stored in encrypted form on the offline password generator, multiple parameters stored in unencrypted form on offline password generator, and multiple parameters (that include a username) provided as input to offline password generator by a user of the offline password generator, and provides the password as output to the user of the offline password generator.

Figure 4:
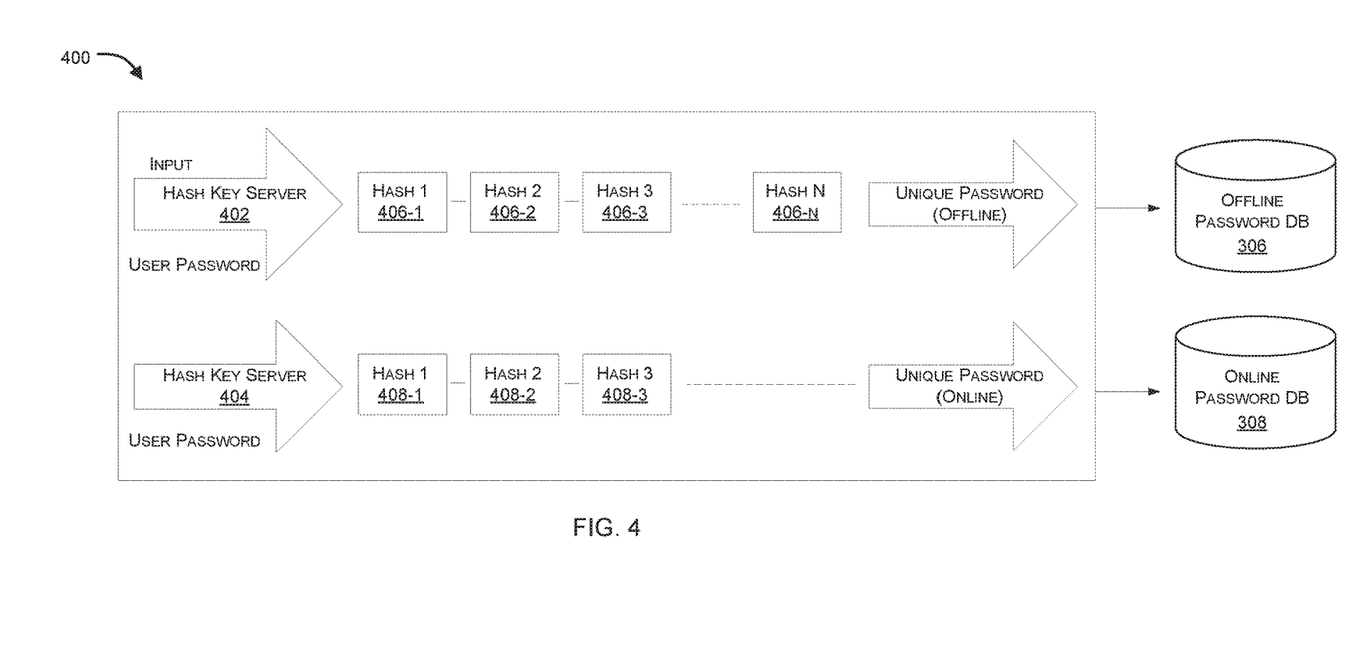
FIG. 4 illustrates an exemplary block diagram showing generation of online/offline passwords in accordance with an embodiment of the present disclosure.

FIG. 4 illustrates an exemplary representation of hash key engine 400 in accordance with an embodiment of the present invention. According to one embodiment, hash key engine 400 can include a hash key server such as 402, a plurality of hash key generators such as 406-1, 406-2, 406-3, . . . , 406-N, subsequently and collectively referred as hash key generator(s) 406 hereinafter, which can be used for generation of hash key values for offline password(s) to be eventually stored in the offline password database such as 306. A similar hash key server 404 can also be configured for generation of online passwords using hash key generators such as 408-1, 408-2, and 408-3, to be eventually stored in the online password database such as 308. As can be seen, the "slow hash" value for generation of offline passwords is high/large (1-N) (e.g., first slow hash value), wherein, the "slow hash" value for generation of online passwords is minimal (1-3) (e.g., second slow hash value). One should appreciate that the number of hash key generators to be incorporated for generation of offline/online passwords can be defined by the network administrator depending on the desired slow hash value, wherein the higher the value, the more time it would take for authenticating a user but would enhance the network security and significantly reduce the possibility of successful intrusion.

In another embodiment of the present disclosure, slow hash key algorithm can be coupled with other security and encryption technique/systems for enhancing the password security such as adding salt, and memory hard functions such as scrypt which can be used with slow hash key algorithm either singularly or in other desired/defined combination.

In an exemplary implementation, hash key server 402 and/or hash key server 404 can be configured to receive password input from a user, and combine it with the hash key algorithm to pass the information to a hash key generator 406/408 for generation of hash key for offline/online password. The number of times the hashing is performed for generation of a hash key can be as defined by the hash key server. In general, hash key generators 406 and 408 can be so configured that the hash key value generated for online passwords is of the order of seconds, in general, and can be between few milli seconds to 02 seconds (e.g., second slow hash value), and for offline passwords can be of the order of few minutes, in general, and 50 seconds to 150 seconds in particular (e.g., first slow hash value). However, such ranges are completely exemplary and non-limiting.

In one embodiment, the user would be asked to choose a random time for "slow hash" value at the time of creating the user account. User needs to enter the same at the time of offline login, along with password. This way, the output space is increased. Intruder has to try out combination of triple product of password space, Salt, and duration (1, 2 . . . N) for each password, making cracking the password using brute force or dictionary attacks nearly impossible.

In an embodiment of the present disclosure, a single hash key server can be used for configuration with the hash key algorithm, which can be used for generating hash key values for online and offline passwords. In another embodiment of the present disclosure, a single password input from the user can be used for generation of hash key value for online and offline passwords. In another embodiment, the user can be asked to feed in two separate passwords, wherein one password can be used for generation of online password and the second password can be used for generation of offline password.

Typically, low "slow hash" value is preferred so that user perception in terms of time required to log-on is not impacted. If the "slow hash" value is high, then the CAS would spend more computational resources to authenticate each user. In case of online authentication, multitude of users would be trying to log-on at the same time, and therefore if the computational resources are busy authenticating multitude of users, an attacker can use this as a weakness of the system and launch "Denial Of Service or Distributed Denial of Service" attacks by bombarding the system with many authentication requests. Therefore, keeping a higher "slow hash" value for online passwords is not a viable option. To mitigate the same and also as safety measure, CAS would be kept in highly secured environment (beyond firewalls).

On the other hand, providing firewall-based access is not possible to each network element, especially when they are not accessible remotely. When an operator needs to logon to NE offline, the password must be available locally but the lack of protection like firewall makes the password easy target to intruders. Therefore, it is paramount to make these passwords useless even if someone steals them, one way to achieve this can be by keeping the 'slow hash" value very high so that it would take years to crack the password. Since offline authentication is specific to one network element and only 1-2 operators would try to logon in person, the additional time required to logon a user is a fair price to be paid for improved security of the overall system.

In one exemplary implementation, a user can be asked to choose a random time for "slow hash" value at the time of creating the user account. For the same, the user can enter the same at the time of offline login, along with password, in which way the output space is increased. Intruder then would have to try out combination of triple product of password space, Salt, and duration (1, 2 . . . N) for each password which makes cracking the password using brute force or dictionary attacks nearly impossible.

Figure 5:
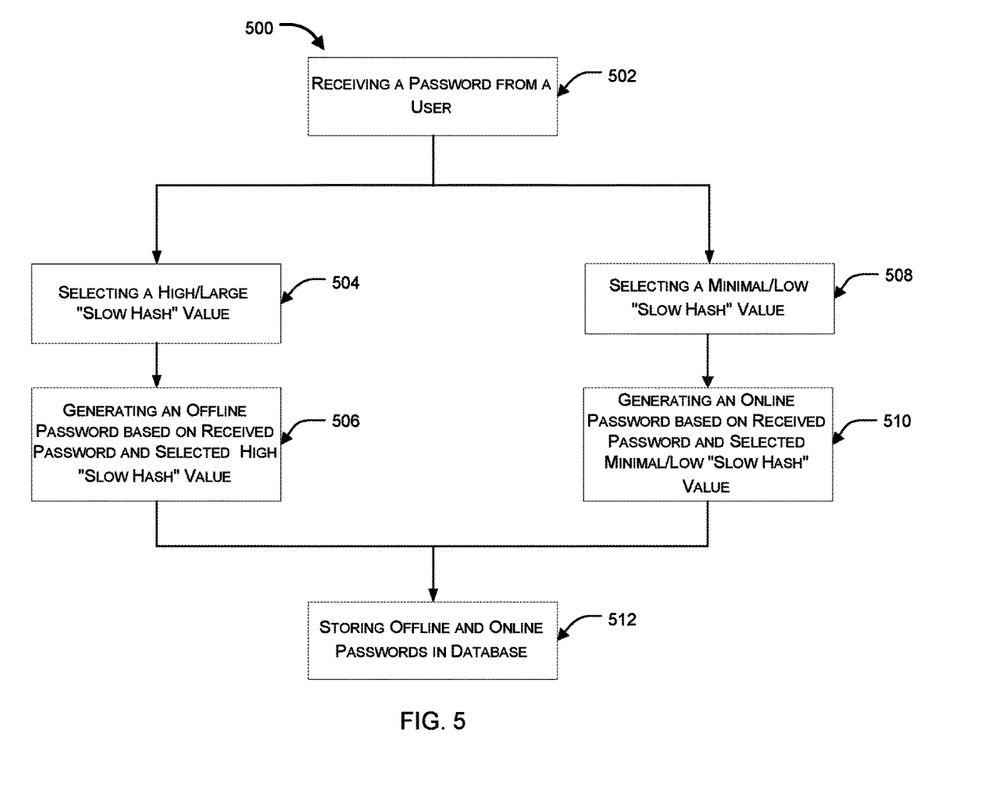
FIG. 5 illustrates an exemplary flow diagram for generation of online/offline passwords in accordance with an embodiment of the present disclosure.

FIG. 5 illustrates an exemplary flow diagram 500 of password generator to be implemented by means that are/is operatively coupled with CAS in accordance with an embodiment of the present invention. At step 502, a password is received from a user at the generator, wherein at step 504, a high slow hash value (e.g., first slow hash value) can be selected automatically and/or manually based on which, at step 506, the offline password can be generated and then stored in an offline password database. At step 508, on the other hand, a minimal slow hash value (e.g., second slow hash value) can be selected automatically and/or manually, based on which, at step 510, the online password can be generated and then stored in an online password database. Finally, at step 512, the offline and online passwords can be stored in a database/repository.

Figure 6:
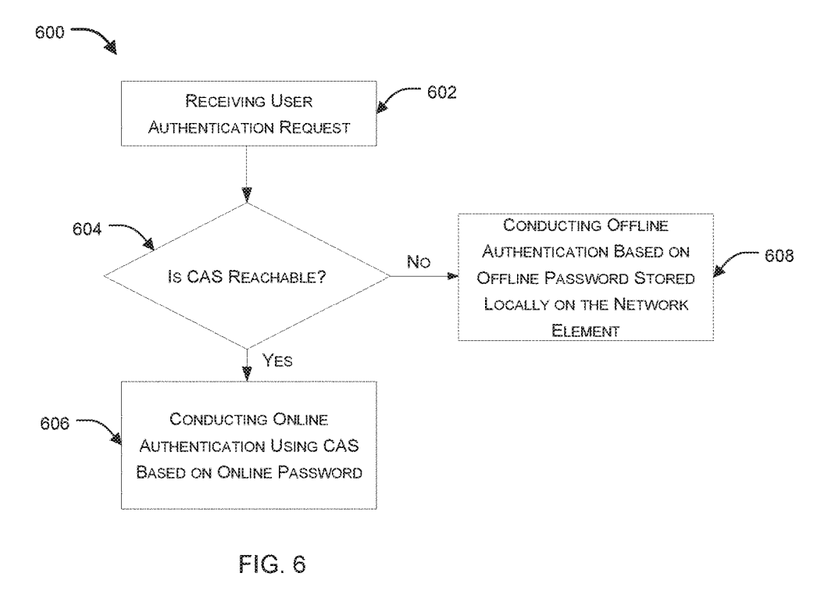
FIG. 6 illustrates an exemplary flow diagram for user authentication in accordance with an embodiment of the present disclosure.

FIG. 6 illustrates another exemplary flow diagram 600 for user authentication based on the proposed system in accordance with an embodiment of the present invention. At step 602, an authentication request can be received from a user. At step 604, the network element can determine if CAS is reachable/functional/available, based on which, if the CAS is reachable, at step 606, online authentication can take place at the CAS using the online password, else, at step 608, offline authentication can take place locally at the network element using the offline password stored at the network element.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Advantages of the Invention

The present disclosure presents a design of a secure password system that can generate online and offline password for logging onto a secure network.

The present disclosure presents a design of a secure password system that can generate online and offline password using hash key method.

The present disclosure presents a design of a secure password system that can generate online and offline password using slow hash key method.

The present disclosure presents disclosure to present a design of a secure password system that can generate online and offline password using slow hash key, wherein the slow hash key value for online password and offline password can be different.

The present disclosure presents a design of a secure password system that can generate online and offline password using slow hash key method, wherein the slow hash key value for online password can be minimal, i.e., in order of seconds.

The present disclosure presents a design of a secure password system that can generate online and offline password using slow hash key method, wherein the slow hash key value for offline password can be large/high, i.e., in order of minutes.

The present disclosure presents a method wherein the user uses online password to log onto a network element by means of centralized authentication system (CAS).

The present disclosure presents a method wherein the user can use offline password, whenever CAS is offline, to authenticate itself at a network element (NE).

While embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

I claim:

1. A system configured to enable user authentication, said system comprising:
a network element comprising circuitry that receives an offline password for offline authentication from a centralized authentication system (CAS), wherein said CAS is configured to store, for at least one user, said offline password and an online password for online authentication, and wherein said offline password is generated by performing a hash algorithm for a first plurality of iterations across a first duration of time, and said online password is generated by performing the hash algorithm for a second plurality of iterations across a second duration of time, wherein the first duration of time is greater than the second duration of time, wherein the first duration of time is more than a minute and the second duration of time is more than a second, and wherein the offline password is associated with a time period for which the offline password is valid;
wherein said network element authenticates said at least one user in online mode based on said online password stored at said CAS when said CAS is reachable; and
wherein said network element authenticates said at least one user in offline mode based on said offline password stored at said network element when said CAS is not reachable, and wherein if said offline password is not stored at said network element at the time the CAS is not reachable, said network element waits till said CAS is reachable and then perform said user authentication.

2. The system of claim 1, wherein said offline password is received from said CAS during handshake between said CAS and said network element, wherein said handshake takes place during any or a combination of change of said password, change in configuration/status of CAS, re-establishment of lost connection, periodic intervals, or based on one or more user-defined actions.

3. The system of claim 1, wherein said network element comprises one or a combination of a user computing device, laptop, PC, tablet, mobile phone, smart-phone, server, router, switch, gateway device, and network compatible device.

4. The system of claim 1, wherein said offline password and said online password are generated by means of a hash based password generator that uses one or more hash keys to generate a first slow hash value based offline password, and a second slow hash value based online password.

5. The system of claim 1, wherein the hashing algorithm is combined with one or a combination of a security technique, an encryption technique, adding salt technique, and a memory hard function.

6. The system of claim 1, wherein said system forms part of said network element, and wherein said system prefers conducting CAS based online authentication over network element based offline authentication.

7. The system of claim 1, wherein said at least one user is asked to choose a random time for said first duration of time and/or said second duration of time at a time of creating a user account.

8. The system of claim 7, wherein said random time is chosen by said at least one user along with a password at the time of said offline authentication.

9. A method comprising the steps of:
receiving, from a centralized authentication system (CAS), at a network element that has a circuitry, an offline password for offline authentication, wherein said CAS is configured to store, for at least one user, said offline password and an online password for online authentication, and wherein said offline password is generated by performing a hash algorithm for a first plurality of iterations across a first duration of time, and said online password is generated by performing the hash algorithm for a second plurality of iterations across a second duration of time, wherein the first duration of time is greater than the second duration of time, wherein the first duration of time is more than a minute and the second duration of time is more than a second, and wherein the offline password is associated with a time period for which the offline password is valid;
authenticating, at said network element, said at least one user in online mode based on said online password stored at said CAS when said CAS is reachable; and
authenticating, at said network element, said at least one user in offline mode based on said offline password stored at said network element when said CAS is not reachable, wherein if said offline password is not stored at said network element at the time the CAS is not reachable, said network element waits till said CAS is reachable and then perform user authentication.

10. The method of claim 9, wherein the offline authentication is permitted even when the CAS is reachable.

* * * * *